United States Patent Office 2,918,447
Patented Dec. 22, 1959

2,918,447

PREPARATION OF DRY SOLUTIONS OF ACRYLO-NITRILE VINYLPYRIDINE COPOLYMERS

George E. Ham, Easton, Pa., assignor to The Chemstrand Corporation, Decatur, Ala., a corporation of Delaware No Drawing. Application October 19, 1955
Serial No. 541,542

9 Claims. (Cl. 260—34.2)

This invention relates to the preparation of solutions of polymeric materials and it relates particularly to the preparation of anhydrous solutions of acrylonitrile-vinylpyridine copolymers in organic solvents. This application is the continuation-in-part of my copending application Serial No. 339,181, filed February 26, 1953, now abandoned.

Acrylonitrile has previously been used in the preparation of various polymers which are characterized by insolubility, or very low solubility, in many of the usual organic solvents. Many of these polymers especially those containing high percentages of acrylonitrile, are further characterized by their lack of susceptibility to organic dyes, it being well known that fibers spun from polyacrylonitrile solutions can be passed through dye baths without material amounts of the dye adhering to the fiber.

Attempts have been made to increase the dyeability of acrylonitrile fibers by interpolymerizing acrylonitrile with certain monomers whose polymers have an affinity for dyes. While this procedure does give polymer products from which fibers having good dyeing properties can be obtained, a serious drawback arises in certain instances due to a substantial lowering of the softening point of the fiber. For example while an interpolymer of acrylonitrile and vinyl acetate containing about 80 percent by weight of acrylonitrile and 20 percent by weight of vinyl acetate in the polymer molecule can be drawn into fibers readily susceptible to dyes, the softening point of such fibers is too low for practical purposes, softening of the fibers being observed at about 150–170° C.

More recently it has been learned that polymeric substances having the desirable physical properties of polyacrylonitrile and the desirable chemical properties of natural fibers, i.e. dye receptivity, can be prepared by blending techniques. Particularly useful fibers can be prepared by blending from 50 to 99 percent by weight of a copolymer of at least 80 percent by weight of acrylonitrile and not more than 20 percent of another polymerizable monoolefinic monomer copolymerizable therewith and from one to 50 percent of a second copolymer of at least 30 percent by weight of a vinylpyridine and not more than 70 percent of acrylonitrile. Such blends should have a vinylpyridine content in polymerized form of from one to 15 percent, based on the total weight of the blend. Preferred blends are those wherein a polymer of high acrylonitrile content is blended with a polymer of lesser acrylonitrile content, but relatively large vinylpyridine content. For example, fibers possessing practically all the desirable physical properties of polyacrylonitrile and the chemical properties of wool can be obtained by spinning blends of one polymer, containing at least 90 percent of acrylonitrile and up to 10 percent of another monomer, with a second polymer containing from 40 to 60 percent of vinylpyridine and from 60 to 40 percent of acrylonitrile.

The monomers which may be copolymerized with acrylonitrile to form the high acrylonitrile content copolymers (at least 80 percent acrylonitrile) include, among others, vinyl acetate, vinyl chloride, esters and other derivatives of acrylic and methacrylic acids, styrene, methyl vinyl ketone, isobutylene or other similar polymerizable hydrocarbons.

Several methods for preparing the polymers used in the blends are known and practiced. In the preparation of the polymers containing from 40 to 60 percent of vinylpyridine and 60 to 40 percent of acryonitrile, the method generally considered most desirable is an emulsion polymerization. Other polymerization methods, i.e. bulk and solution, are difficult to control thermally and are quite slow when operating at conditions suitable for obtaining polymers of high molecular weight. In emulsion polymerization, each microscopic dispersed droplet is surrounded by water ready to withdraw heat, and the polymerizing material has only moderate viscosity allowing good heat transfer to the walls of the reaction vessel used. Because of these and other advantages, it is most desirable to use the emulsion method for polymerization of the acrylonitrile-vinylpyridine copolymers. Emulsion polymerization is intended to include modifications such as that described in U.S. Pat. 2,537,031.

Emulsion polymerization is not without its disadvantages, however, particularly when the resulting polymer is to be blended with a second polymer having a high acrylonitrile content. Blending of two polymers can most satisfactorily be accomplished by solvent blending, using solvents such as dimethyl formamide, tetramethylene cyclic sulfone, dimethylacetamide, or other reagents which are solvents for both polymers to be blended. In such blending methods, it is essential that water be excluded or else the polymer particles of high acrylonitrile content tend to aggregate or "ball." This phenomenon results from the tendency of the polymer particles to become swollen and covered with a viscous coating which hinders the dissolving action of the solvent. It is obvious that efficient blending cannot be accomplished under such conditions. To avoid such a result, it has been the practice to break the emulsion resulting from the use of emulsion polymerization methods, filter off the solid polymeric material and dry in an oven. It is of course well known that a solid mass such as an acrylonitrile-vinylpyridine polymer cannot be dried efficiently due to poor heat transfer, consequently expensive and time consuming heating operations have been heretofore employed to dry such polymers prior to dissolving in a solvent for blending with a second polymer.

I have now discovered a method whereby these difficulties of the prior art methods are avoided, and blending is accomplished in a quick, efficient and economical manner. Furthermore, solutions of acrylonitrile-vinylpyridine polymers are prepared in the known solvents therefor, water is easily removed, and the solutions can readily be used to blend with solutions of high acrylonitrile content polymers.

In accordance with the present invention copolymers of acrylonitrile and vinylpyridine are prepared in aqueous emulsion and the emulsion, after polymerization, is mixed directly with a water miscible organic solvent for acrylonitrile polymers. The water present in the resulting mixture is then removed by distillation, using any conventional distallation apparatus and method. Preferably, however, the water is removed by the use of a film evaporator. After the last traces of water have been removed, or the distillation has proceeded to a point such that the remaining water will present no difficulties in subsequent blending operations, the distillation is terminated. The distilland, consisting of a solution of the acrylonitrile-vinylpyridine polymer, is then ready for blending with the high acrylonitrile content polymer. The actual blending can be accomplished by separately preparing a solution of the other polymer followed by mixing of the two solutions, or the other polymer can be dissolved in the solution of acrylonitrile-vinylpyridine copolymer.

It has been found that it is not necessary to remove the last trace of water from the solution of acrylonitrile-vinylpyridine copolymer in organic solvent, but that as much as 2.0 percent of water by weight can remain without causing the second polymer to "ball" when mixed with the solution. The expression "substantially anhydrous" as used herein is intended to mean a water content of less than about 2.0 percent by weight of total mixture.

The aqueous emulsion of acrylonitrile-vinylpyridine copolymer can be mixed with the water miscible organic solvent for acrylonitrile polymers by addition of emulsion to solvent, or solvent to emulsion but it is essential that mixture be accomplished with agitation to insure dissolution of polymer in solvent. The solvent should also be heated to at least 80° C. prior to mixing to insure complete dissolution of polymer. In one embodiment of the invention the solvent is heated to a temperature above 100° C. and maintained at such temperature during the addition of the emulsion thereto at a slow rate and with agitation. In this manner water is continuously removed during the addition of emulsion, and is completed subsequent to addition of the final increment.

Solvents suitable for use in this invention include all the known water miscible organic solvents for acrylonitrile polymers. Among such solvents are dimethylformamide, dimethylacetamide, gamma- butyrolactone, ethylene carbonate, succinonitrile, dimethyl sulfone, dimethyl sulfoxide, and tris-dimethylaminophosphine oxide.

As used herein, the term "a vinylpyridine" is intended to include all those compounds having the structure.

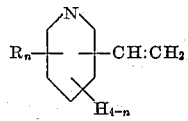

wherein R is methyl or ethyl and $n$ is an integer from 0 to 4, inclusive. As examples of compounds falling within the scope of the formula may be mentioned 5-ethyl-2-vinylpyridine, 5-methyl-2-vinylpyridine, 2-methyl-5 vinylpyridine, 2- vinylpyridine, and the like.

It will be understood that the emulsions referred to may contain other materials in addition to the water and polymer. Catalysts used to promote the polymerization may be present and as examples may be mentioned water-soluble peroxy catalysts such as sodium peroxide, hydrogen peroxide, potassium persulfate, sodium percarbonate, sodium perborate, etc. In addition, wetting agents or emulsion stabilizers may have been used and remain in the emulsion. Examples of reagents for this purpose are the water soluble salts of fatty acids, such as sodium oleate and potassium stearate, mixtures of water-soluble fatty acid salts, such as common soaps, prepared by the saponification of animal and vegetable oils, the "amine soaps," such as salts of triethanolamine and dodecylmethylamine, salts of rosin acids, etc. The polymerization may also have been conducted in the presence of a molecular weight regulator for example, t-dodecyl mercaptan, thioglycolic acid, thiourea, mercaptobenzothiazole and carbon tetrachloride, and it may be present in the emulsion.

When the method of this invention is utilized to prepare solutions of acrylonitrile polymers for blending, much better results are obtained than when using the prior art method of breaking the emulsion and driving water from the resulting solid. For example, a considerable saving in time is achieved and much less heat is required due to the superior heat conductivity of the liquid system.

The process of the invention is further illustrated by the following specific examples, in which parts are given by weight.

Example I

Eight hundred cc. of dimethylacetamide was added to a 2 liter flask and heated to 100° C. Then 200 cc. of an aqueous emulsion (25 percent solids) of a copolymer of 50 parts of acrylonitrile and 50 parts of 2-vinylpyridine was added with stirring. A clear solution resulted. The solution was then transferred to the pot of a 4-foot column packed with ¼" Berl Saddles, and heat applied to distill off water. A total of 150 cc. of water was removed by distillation and an intermediate cut of 50 cc. was removed. The resulting 7 percent solution of acrylonitrile 2-vinylpyridine copolymer in dimethylacetamide contained 0.17 percent water.

Example II

A two liter flask was charged with 950 cc. of dimethylacetamide. While stirring at 80° C., 433 g. of an aqueous emulsion (28 percent solids) of a copolymer of 50 parts acrylonitrile and 50 parts 2-methyl-5-vinylpyridine was added. The pressure was reduced to cause refluxing at 75° C. (190 mm.) and was then advanced gradually keeping the pot temperature below 100° C. until 615 g. of distillate was recovered. The distillate contained 312 g. of water and 304 g. of dimethylacetamide. The resultant solution contained 16.2 percent of the polymer and 0.5 percent water.

Example III

A two liter flask was charged with 950 cc. of dimethylacetamide and 88 g. of benzene sulfonic acid. Four hundred and thirty-three grams of a 28 percent aqueous emulsion of a copolymer of 50 percent acrylonitrile and 50 percent 2-methyl-5-vinylpyridine was added thereto over 15 minutes. The water was distilled off as in Example II. The final solution contained 14.1 percent solids and 1.9 percent water, and was a light tan color.

Example IV

A total 546 g. of the substantially dry solution prepared in Example III was blended with 2931 g. of dimethylacetamide containing 523 grams of a polymer containing 95 percent acrylonitrile and 5 percent vinyl acetate. After thorough mixing, the solution was spun into fibers which had excellent dyeability with acid dyes.

Example V

A spinning solution was prepared by blending 88 parts of a solution of dimethylacetamide containing 15 percent of a copolymer of 90 percent acrylonitrile and 10 percent vinyl acetate, with 12 parts of the solution prepared in Example I. Fibers spun from the resulting solution possessed excellent physical properties and were easily dyed with conventional acid dyes.

I claim:
1. The method of preparing substantially anhydrous organic solvent solutions of acrylonitrile-vinylpyridine copolymers from aqueous emulsions of such copolymers, which comprises mixing with agitation said aqueous emulsion with a water miscible organic solvent for acrylonitrile-vinylpyridine copolymers and distilling off substantially all the water from the mixture.

2. The method of preparing substantially anhydrous organic solvent solutions of copolymers of acrylonitrile and a vinylpyridine from aqueous emulsions thereof, which comprises heating a water miscible organic solvent for such copolymers to a temperature above about 80° C., mixing said aqueous emulsion with the said organic solvent while agitating the mixture, and thereafter removing substantially all the water from the said mixture by distillation.

3. The method of removing water from an aqueous emulsion of a copolymer of acrylonitrile and a vinylpyridine, which comprises mixing with agitation said emulsion with a water miscible organic solvent for said copolymer at temperature above about 80° C. and distilling off substantially all the water from the resulting mixture.

4. The method of preparing substantially anhydrous solutions of copolymers of from 40 to 60 percent by weight acrylonitrile and from 60 to 40 percent by weight of a vinylpyridine from aqueous emulsions of such copolymers which comprises mixing with agitation said aqueous emulsion with a water miscible organic solvent for such copolymers and distilling off substantially all the water from the resulting mixture.

5. The method of preparing substantially anhydrous organic solvent solutions of copolymers of from 40 to 60 percent by weight of acrylonitrile and from 60 to 40 percent by weight of a vinylpyridine from aqueous emulsions thereof which comprises heating a water miscible organic solvent for such copolymers to a temperature above 80° C., mixing said aqueous emulsion with the said heated solvent while agitating the mixture, and thereafter removing substantially all the water from the said mixture by distillation.

6. The method of removing water from an aqueous emulsion of a copolymer of 40 to 60 percent by weight acrylonitrile and 60 to 40 percent by weight of a vinylpyridine which comprises mixing with agitation said emulsion with a water miscible organic solvent for said copolymer at a temperature above about 80° C. and distilling off substantially all the water from the resulting mixture.

7. The method of preparing substantially anhydrous dimethylacetamide solutions of copolymers of 40 to 60 percent by weight acrylonitrile and 60 to 40 percent by weight of a vinylpyridine from aqueous emulsion of such copolymers which comprises mixing with agitation said aqueous emulsion with dimethylacetamide and distilling off substantially all the water from the resulting mixture.

8. The method of preparing substantially anhydrous dimethylacetamide solutions of copolymers of 40 to 60 percent by weight acrylonitrile and 60 to 40 percent by weight of a vinylpyridine from aqueous emulsions thereof which comprises heating dimethylacetamide to a temperature above about 80° C., mixing said aqueous emulsion with said heated dimethylacetamide while agitating the mixture and thereafter removing substantially all the water from the said mixture by distillation.

9. The method of preparing a spinning solution of a blend of 50 to 99 percent by weight of a first copolymer, of at least 80 percent by weight of acrylonitrile and not more than 20 percent by weight of another polymerizable mono-olefinic monomer copolymerizable therewith, and from one to 50 percent by weight of a second copolymer, of at least 30 percent by weight of a vinylpyridine and not more than 70 percent by weight of acrylonitrile, in a water miscible organic solvent for such blend, which comprises mixing with agitation an aqueous emulsion of said copolymer with a water miscible organic solvent therefor, distilling off substantially all the water from the resulting mixture to give a substantially anhydrous solution of said second coplymer in said solvent, and thereafter mixing said substantially anhydrous solution with a solution of said first copolymer in the same solvent.

References Cited in the file of this patent

UNITED STATES PATENTS

| | | |
|---|---|---|
| 2,373,347 | Schoenfeld | Apr. 10, 1945 |
| 2,460,582 | Japs | Feb. 1, 1949 |
| 2,637,717 | Basdekis | May 5, 1953 |
| 2,683,129 | Bratton et al. | July 6, 1954 |

FOREIGN PATENTS

| | | |
|---|---|---|
| 698,714 | Great Britain | Oct. 21, 1953 |